US007027379B2

(12) United States Patent
Kaneko

(10) Patent No.: US 7,027,379 B2
(45) Date of Patent: Apr. 11, 2006

(54) OPTICAL PICKUP OBJECTIVE LENS SYSTEM

(75) Inventor: Isamu Kaneko, Kawaguchi (JP)

(73) Assignee: Enplas Corporation, Saitama (JP)

( * ) Notice: Subject to any disclaimer, the term of this patent is extended or adjusted under 35 U.S.C. 154(b) by 407 days.

(21) Appl. No.: 10/459,643

(22) Filed: Jun. 4, 2003

(65) Prior Publication Data

US 2004/0027971 A1 Feb. 12, 2004

(30) Foreign Application Priority Data

Jun. 6, 2002 (JP) ............................ 2002-165550
Jun. 12, 2002 (JP) ............................ 2002-171523

(51) Int. Cl.
*G11B 7/00* (2006.01)

(52) U.S. Cl. ........................... 369/112.23; 369/112.24; 369/112.01; 369/112.08; 369/44.23

(58) Field of Classification Search .................... None
See application file for complete search history.

(56) References Cited

U.S. PATENT DOCUMENTS

| | | | | |
|---|---|---|---|---|
| 5,251,063 | A * | 10/1993 | Baumann | 359/355 |
| 2003/0210472 | A1* | 11/2003 | Morooka et al. | 359/692 |
| 2005/0190455 | A1* | 9/2005 | Rostalski et al. | 359/649 |

* cited by examiner

*Primary Examiner*—Muhammed Edun
(74) *Attorney, Agent, or Firm*—Koda & Androlia

(57) ABSTRACT

An optical pickup objective lens system for collecting a laser beam emitted from a light source onto a recording surface of an optical recording medium includes three lenses having negative, positive and negative powers sequentially, or positive, negative and positive powers sequentially in the order from the side of the light source toward the optical recording medium. The three lenses are bonded to one another through two joint faces, and each of the two joint faces is formed into an aspherical shape. Thus, the chromatic aberration can be corrected satisfactorily. Especially, even when a laser beam having a short wavelength is used, the recording and replaying of information can be carried out reliably and stably.

2 Claims, 12 Drawing Sheets

F I G. 1
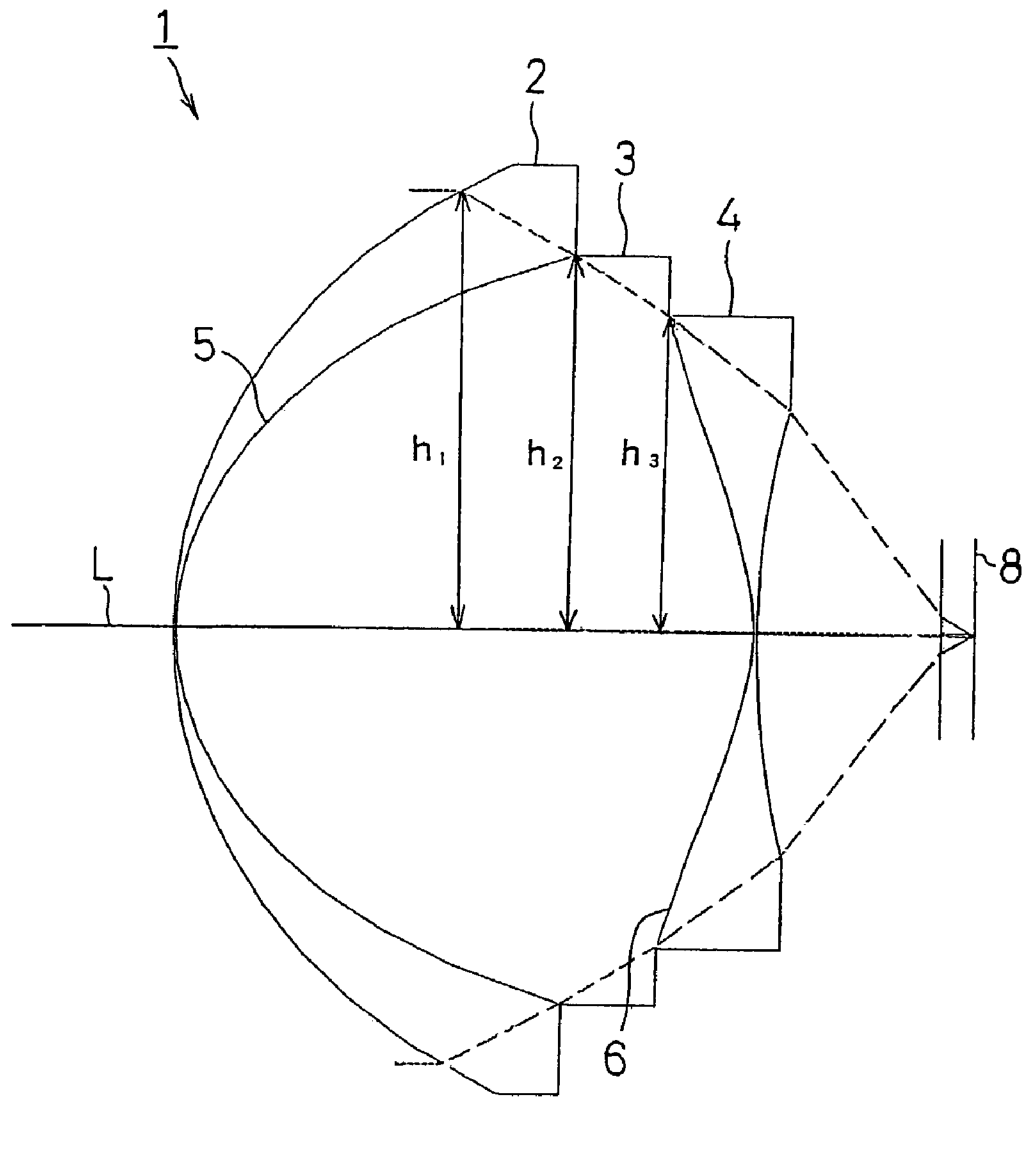

F I G. 2
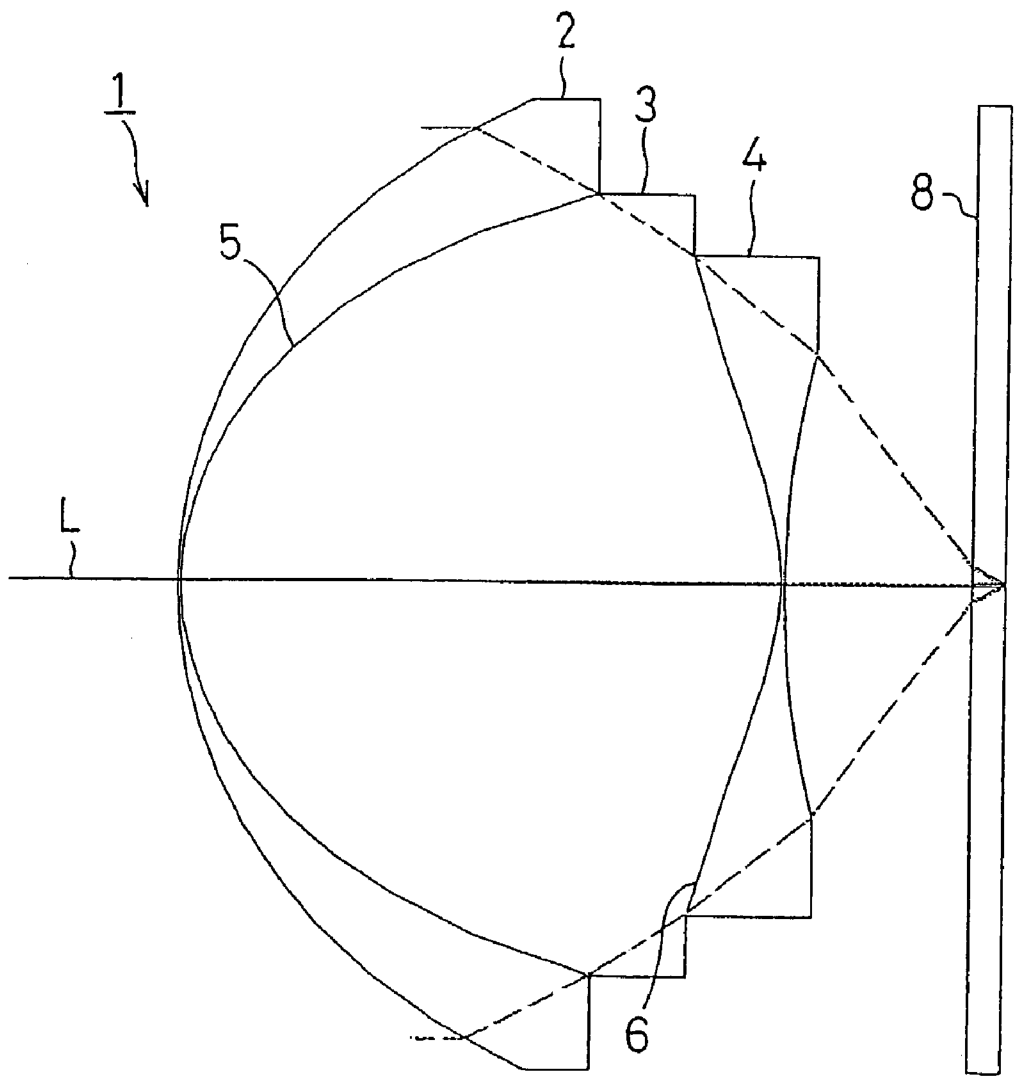

F I G. 3
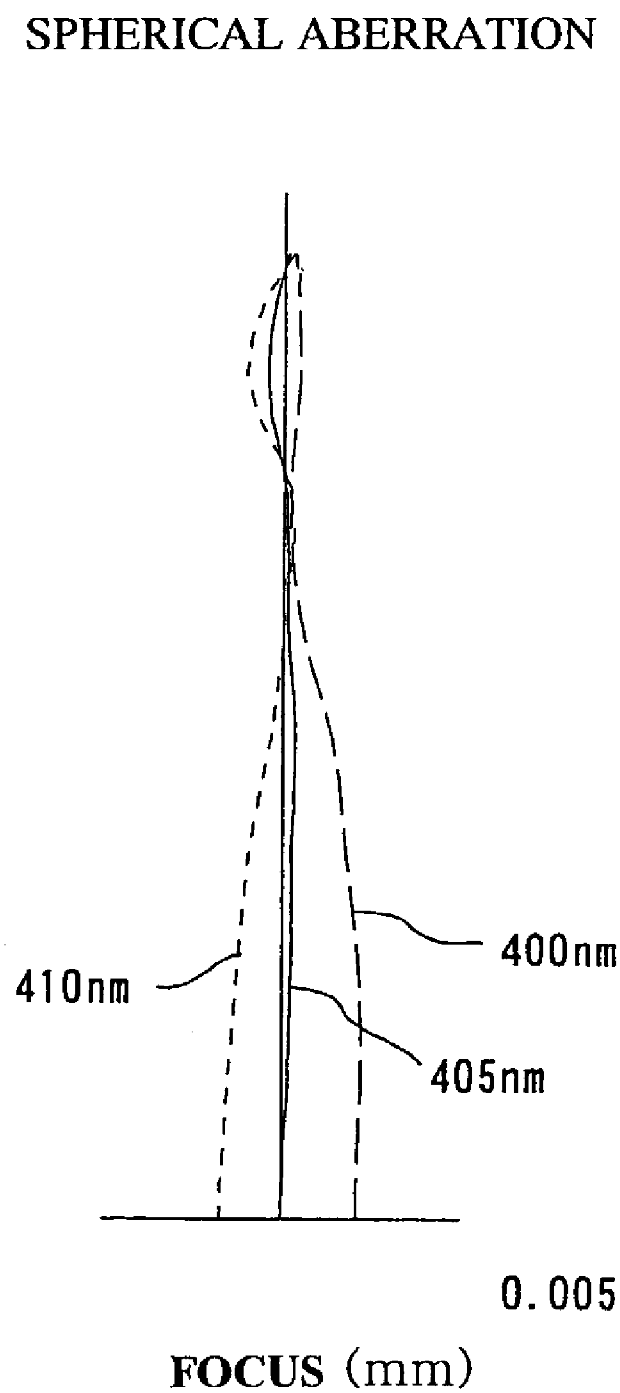

F I G. 5
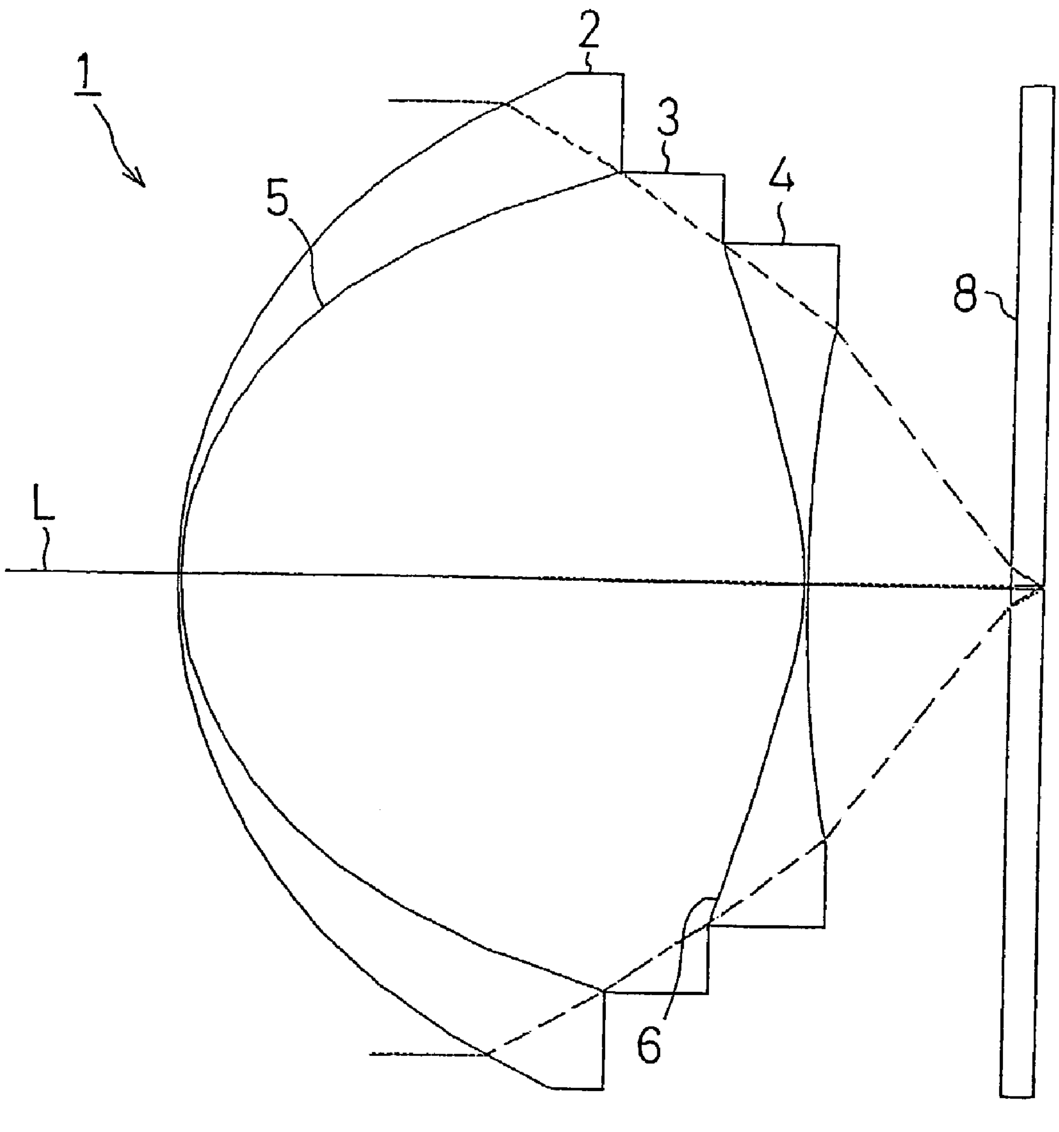

F I G. 6
SPHERICAL ABERRATION
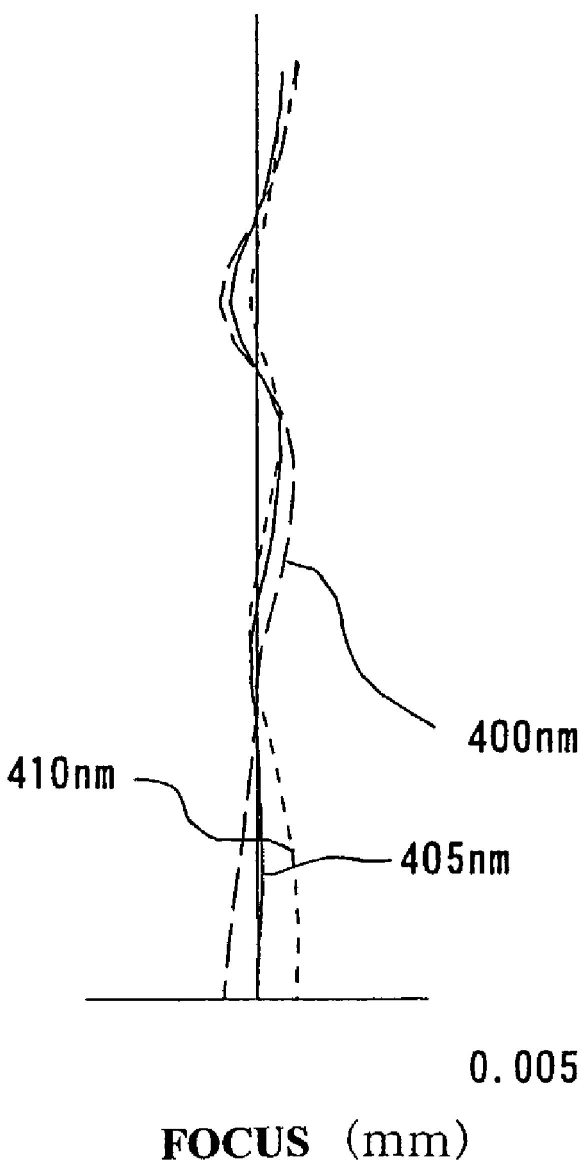

SPHERICAL ABERRATION

FOCUS (mm)

F I G. 9
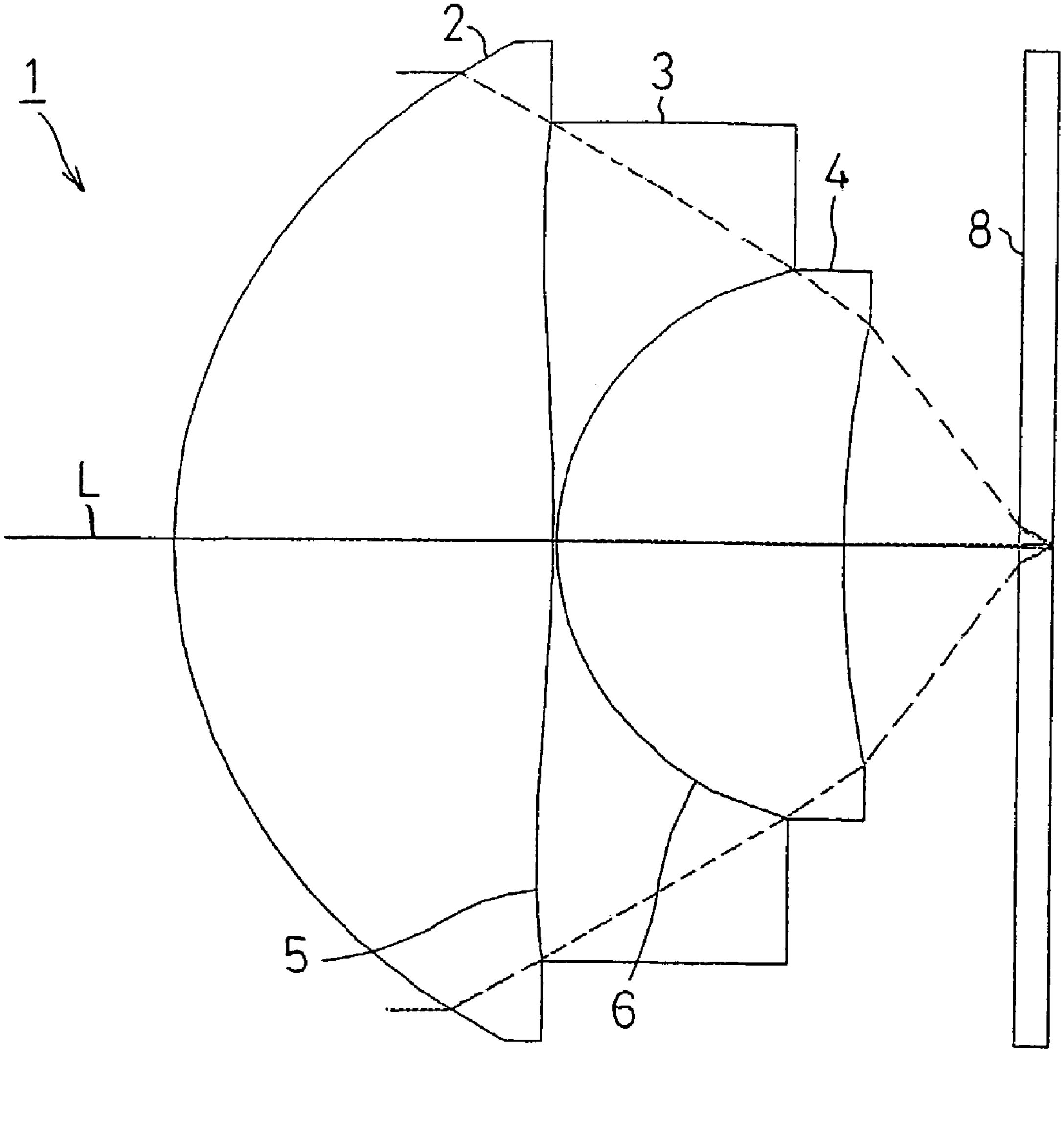

F I G. 1 1
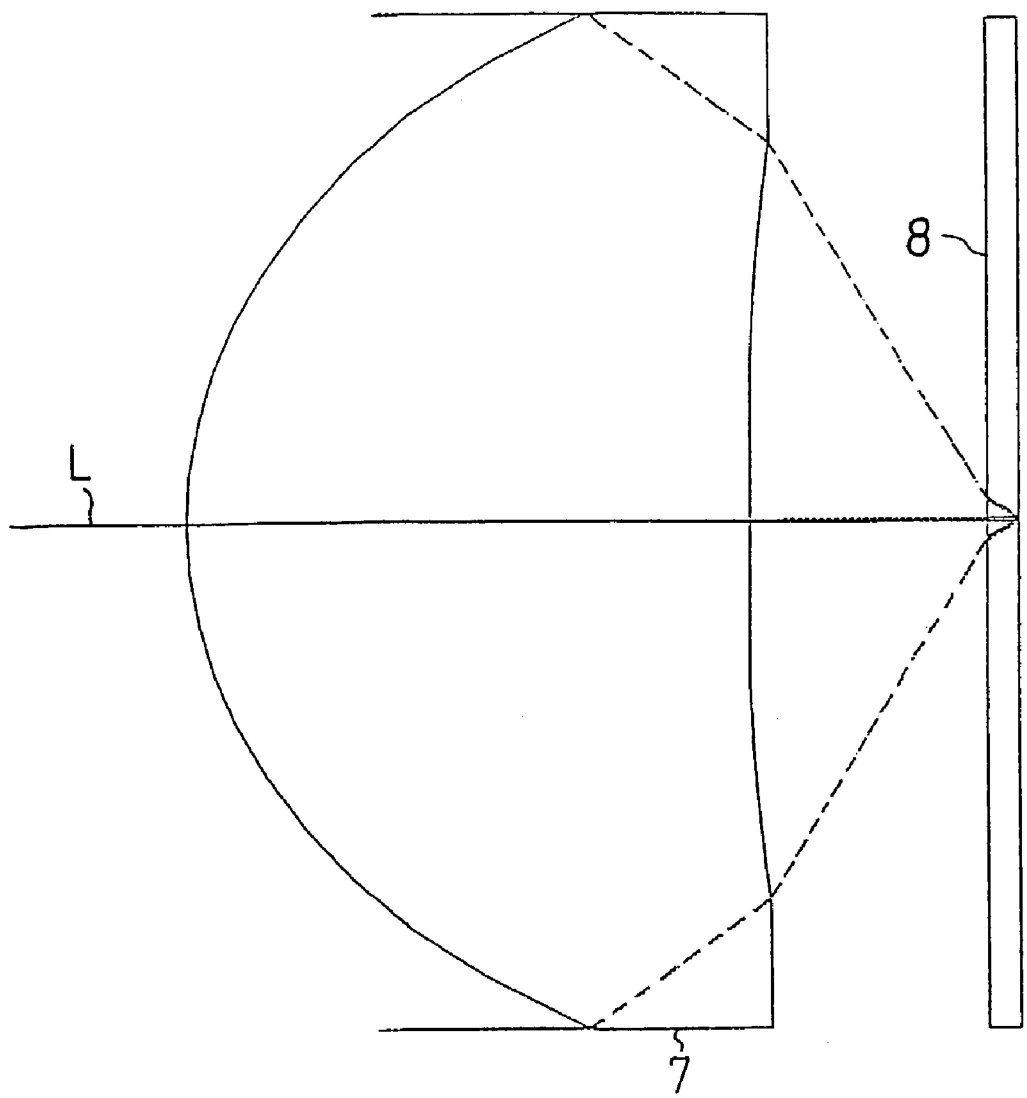

SPHERICAL ABERRATION

FOCUS (mm)

OPTICAL PICKUP OBJECTIVE LENS SYSTEM

BACKGROUND OF THE INVENTION

1. Field of the Invention

The present invention relates to an optical pickup objective lens system and particularly, to an optical pickup objective lens system for use in an optical pickup device suitable for recording or replaying of high-density information in an optical recording medium.

2. Description of the Related Art

An optical pickup device is conventionally utilized widely for recording of information in an optical recording medium such as an optical disk, e.g., mainly, CD and DVD and for replying of the information recorded in the optical recording medium by applying a laser beam to the optical recording medium.

In such an optical pickup device, an increase in density of information recorded in an optical recording medium is required strongly, and this tendency has been further intensified in recent years.

To increase the recording density, it is necessary to use a laser beam having a shorter wavelength. For example, the wavelength of a laser beam used in the above-described CD is in a range of 780 to 790 nm, and a laser beam having a further shorter wavelength of 650 nm is used in DVD having a higher recording density. To realize a further increase in density, it is necessary to use a laser beam having a further shorter wavelength.

To accommodate to decrease in wavelength of a laser beam used with such an increase in density of the recorded information, it is demanded to enhance the optical performance of even an optical pickup objective lens system used in an optical pickup device, and an objective lens system which can accommodate to a laser beam having a shorter wavelength is desired.

In general, however, the wavelength of a laser beam is relied on a temperature, and the laser beam has a nature that its wavelength is varied slightly with a variation in temperature. In addition, the variation in wavelength of the laser beam occurs even due to a variation in applied voltage. The variation in wavelength of the laser beam also occurs, for example, when the voltage applied to a semiconductor laser is varied, such as when the operations of replaying and recording in an optical recording medium are changed over from one to the other.

Such a variation in wavelength of the laser beam exerts an influence to the refractive index of the optical pickup objective lens system, whereby a focusing point is displaced slightly, resulting in a problem that a chromatic aberration (longitudinal chromatic aberration) is generated.

Such problem of the chromatic aberration is more significant, as the recording density is further increased and the wavelength of the laser beam is more shortened. This is a large subject which must be solved in order to realize an optical pickup objective lens system using a laser beam having a shorter wavelength, for example, nearer to or smaller than 400 nm.

There are conventionally proposed optical pickup objective lens systems of a two-lens arrangement with a variation in wavelength of a laser beam taken into consideration, which are described in Japanese Patent Application Laid-open Nos.2000-90477, 2001-13406 and 2001-216678. Even in the lens system described in these Patent Applications, it is the actual circumstance that the problem of the chromatic aberration attendant on the variation in wavelength is not solved sufficiently.

SUMMARY OF THE INVENTION

Accordingly, it is an object of the present invention to provide an optical pickup objective lens system wherein the wavelength of a laser beam is varied slightly from a standard wavelength, especially in a shorter wavelength range, the chromatic aberration can be corrected satisfactorily to carry out the recording and replaying of information reliably and stably.

To achieve the above object, according to a first aspect and feature of the present invention, there is provided an optical pickup objective lens system for collecting a laser beam emitted from a light source onto a recording surface of an optical recording medium, comprising three lenses having negative, positive and negative powers sequentially or positive, negative and positive powers sequentially in the order from the side of the light source toward the optical recording medium, the three lenses being bonded to one another through two joint faces, each of at least the two joint faces being formed into an aspherical shape.

With such feature, the use of the three lenses ensures that even if a variation in wavelength of the laser beam is generated, the chromatic aberration can be corrected satisfactorily. The formation of each of the joint faces of the lenses ensures that various aberrations such as mainly the chromatic aberration can be corrected further satisfactorily. Especially, even when a laser beam having a short wavelength is used, the recording and replaying of information can be carried out reliably and stably.

According to a second aspect and feature of the present invention, in addition to the first feature, the optical pickup objective lens system satisfies the following condition expression:

$$-0.01\phi<\Sigma\phi_i\Delta i(h_i/h_1)^2<0\phi \quad (1)$$

wherein $\phi$ is a power of the entire optical pickup objective lens system; $\phi_i$ is a power of each of the lenses (i=1, 2, 3); $\Delta i$ is a dispersing ability of a material for each of the lenses in a wavelength in the vicinity of a used wavelength ($\Delta i=(n_{il}-n_{ih})/(n_{ic}-1)$, wherein $n_{ic}$ represents a refractive index in the used wavelength; $n_{il}$ represents a refractive index in a shorter wavelength, and $n_{ih}$ represents a refractive index in a longer wavelength); and $h_i$ is an effective height of each of the lenses.

With such feature, the chromatic aberration can be corrected further effectively by forming the optical pickup objective lens system so that a value of $\Sigma\phi_i\Delta i(h_i/h_1)^2$ which is one factor indicating the chromatic aberration of the entire optical pickup objective lens system satisfies the expression (1) .

The above and other objects, features and advantages of the invention will become apparent from the following description of the preferred embodiment taken in conjunction with the accompanying drawings.

BRIEF DESCRIPTION OF THE DRAWINGS

FIG. 1 is a schematic illustration showing the arrangement of an embodiment of an optical pickup objective lens system according to the present invention;

FIG. 2 is a schematic illustration showing the arrangement of a first example of an optical pickup objective lens system according to the present invention FIG. 3 is a diagram showing a spherical aberration (indicating a vertical aberration) of the optical pickup objective lens system shown in FIG. 2;

FIG. 5 is a schematic illustration showing the arrangement of a second example of an optical pickup objective lens system according to the present invention FIG. 6 is a diagram showing a spherical aberration of the optical pickup objective lens system shown in FIG. 5;

FIG. 9 is a schematic illustration showing the arrangement of a fourth example of an optical pickup objective lens system according to the present invention

FIG. 11 is a schematic illustration showing the arrangement of a conventional optical pickup objective lens system as a comparative example.

DESCRIPTION OF THE PREFERRED EMBODIMENT

Figure 4:
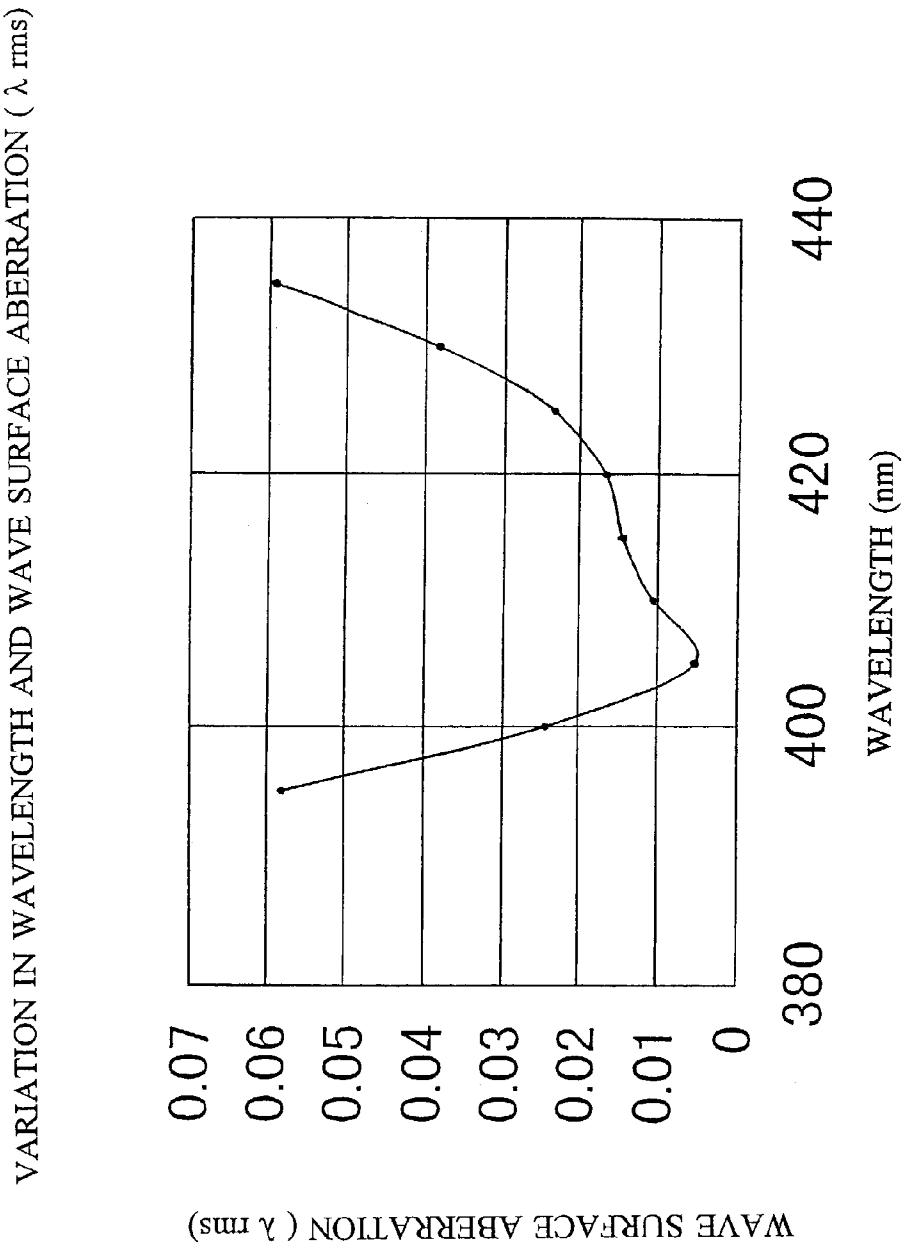
FIG. 4 is a graph showing the relationship between the variation in wavelength of the optical pickup objective lens system shown in FIG. 2 and the wavefront aberration.

The present invention will now be described by way of a preferred embodiment with reference to the accompanying drawings.

Referring first to FIG. 1, An optical pickup objective lens system 1 according to the embodiment is formed in an axially symmetric shape about an optical axis L and includes three lenses 2, 3 and 4, i.e., a first lens 2 having a negative power, a second lens 3 having a positive power, and a third lens 4 having a negative power sequentially in the named order from the side of a light source toward an optical recording medium 8. The three lenses 2, 3 and 4 are integrally bonded to one another through two joint faces, i.e., a joint face (a first joint face 5) between a second face of the first lens and a first face of the second lens adjoining such second face and a joint face (a second joint face 6) between a second face of the second lens and a first face of the third lens adjoining such second face. Further, each of the two joint faces 5 and 6 is formed into an aspherical shape.

By forming the optical pickup lens system 1 by the three lenses 2, 3 and 4, it is ensured that when a laser beam having a short wavelength, for example, near to 400 nm is used, a chromatic aberration can be corrected satisfactorily even if a variation in wavelength of the laser beam based on variations in temperature and applied voltage is generated. In addition, various aberrations such as mainly the chromatic aberration can be corrected satisfactorily by forming each of the first and second joint faces 5 and 6 into the aspherical shape.

Referring again to FIG. 1, each of the first and third lenses 2 and 4 is formed to have the negative power, and the second lens 3 is formed to have the positive power, but the present invention is necessarily not limited to this case. Each of the first and third lenses 2 and 4 may be formed to have a positive power, and the second lens 3 may be formed to have a negative power (see FIGS. 7 and 9). Even in this case, the chromatic aberration can be corrected satisfactorily by a lens system of a three-lens arrangement.

In the present embodiment, the following condition expression is satisfied:

$$-0.01\phi<\Sigma\phi_i\Delta i(h_i/h_1)^2<0\phi \quad (1)$$

wherein $\phi$ is a power of the entire optical pickup objective lens system 1; $\phi_i$ is a power of each of the lenses 2, 3 and 4 (i=1, 2, 3); $\Delta i$ is a dispersing ability of a material for each of the lenses 2, 3 and 4 in a wavelength near to a used wavelength (a standard wavelength); and $h_i$ is an effective height of each of the lenses 2, 3 and 4. A broken line shown in FIG. 1 and connecting positions indicating the effective heights of the lenses 2, 3 and 4 indicates a path of the laser beam running an end of a functioning surface of the optical pickup lens system 1. The value $\Delta i$ is represented by the following equation:

$$\Delta i=(n_{il}-n_{ih})/(n_{ic}-1)$$

wherein $n_{il}$ is a refractive index at the used wavelength; $n_{il}$ is a refractive index at a short wavelength; and $n_{ic}$ is a refractive index at a long wavelength.

$\Sigma\phi_i\Delta i(h_i/h_l)^2$ in the expression (1) is a factor indicating the chromatic aberration of the entire optical pickup objective lens system. If this value $\Sigma\phi_i\Delta i(h_i/h_l)^2$ is increased to exceed a value (0$\phi$)in the expression (1), the correction of the aspherical aberration is insufficient and as a result, the chromatic aberration cannot be corrected satisfactorily. On the other hand, if the value ($\Sigma\phi_i\Delta i(h_i/h_l)^2$) is decreased to smaller than a value (−0.01$\phi$) in the expression (1), the correction of the aspherical aberration is excessive and as a result, the chromatic aberration cannot be corrected satisfactorily.

Therefore, according to the present embodiment, even if a variation in wavelength of the laser beam is generated, the chromatic aberration can be corrected satisfactorily by setting the value ($\Sigma\phi_i\Delta i(h_i/h_l)^2$), so that it satisfies the condition expression (1).

Among the three lenses 2, 3 and 4, the lens having the positive power (the second lens in FIG. 1) may be formed of a glass, and each of the lenses having the negative power (the first and third lenses in FIG. 1) may be formed a resin material such as a plastic material. If the lenses are formed as described above, the lens made of the resin and having the negative power can be formed between opposite surfaces of the one lens having the positive power or the two lenses by a process such as an insertion molding using a mold. In its turn, it is possible to enhance the manufacture efficient of the entire optical pickup objective lens system 1. In addition, the refractive indexes of the glass and the resin material are different from each other and hence, the chromatic aberration on the axis can be corrected satisfactorily by a combination of optical materials having different refractive indexes.

Examples of the present invention will now be described with reference to FIGS. 2 to 10.

In the examples, f1 indicates a focal length (mm) of an optical pickup objective lens system 1, and NA indicates a numerical aperture. In addition, i indicates an i-th optical face in the order from the side of an object (the light source) toward an image surface (toward the optical recording medium); $c_i$ (1/mm) indicates a radius of curvature of the i-th optical face at its center; $d_i$ (mm) indicates a distance from the i-th optical face to the next optical face in the order from the side of the object; and ni indicates a refractive index of an optical system existing between the i-th optical face and the next optical face.

Each of k, A, B, C and D indicates an index in the following equation (2). Namely, if a Z-axis is taken in a direction of the optical axis, and an X-axis is taken in a direction perpendicular to the optical axis, and a direction of running of light is positive, the aspherical shape of the lens is represented by the following equation (2):

$$Z(x)=cx^2/[1+\{1-(k+1)c^2x^2\}^{1/2}]+Ax^4+Bx^6+Cx^8+Dx^{10} \quad (2)$$

wherein k is a conical index, and each of A, B, C and D is an aspherical index.

FIRST EXAMPLE

FIG. 2 shows a first example of the present invention. An optical pickup objective lens system 1 in the first example comprises three lenses 2, 3 and 4 integrally bonded to one another through two joint faces 5 and 6, i.e., a first, second and third lenses having negative, positive and negative powers sequentially in the order from the side of an object as in the embodiment shown in FIG. 1.

The optical pickup objective lens system 1 in the first example is set at the following conditions: Standard wavelength=405 nm; incidence pupil radius=3 mm; NA=0.85; fl=1.76 mm; ϕ=0.568182 (1/mm)

| | | | $n_i$ | | |
|---|---|---|---|---|---|
| i | $c_I$ | $d_i$ | 405 nm | 400 nm | 410 nm |
| 1 (First face of first lens | 0.708 | 0.01 | 1.618 | 1.620 | 1.617 |
| 2 (First joint face) | 1.189 | 1.88 | 1.736 | 1.737 | 1.735 |
| 3 (Second joint face) | −1.460 | 0.01 | 1.618 | 1.620 | 1.617 |
| 4 (Second face of third lens | 0.317 | 0.59 | | | |
| 5 (First face of optical recording medium) | 0.000 | 0.10 | 1.618 | 1.620 | 1.617 |
| 6 (Second face of optical recording medium) | 0.000 | 0.00 | | | |

Aspherical Index

| i | k | A | B | C | D |
|---|---|---|---|---|---|
| 1 | −0.416164 | 7.36e−003 | 4.05e−003 | 0 | 0 |
| 2 | −0.585560 | 2.72e−002 | −6.27e−003 | 0 | 0 |
| 3 | −7.637933 | 6.73e−003 | 3.49e−003 | 0 | 0 |
| 4 | −9.920278 | 1.03e−001 | −7.56e−002 | 0 | 0 |

| i | $\phi_i$ | $\Delta_i$ | $h_i$ |
|---|---|---|---|
| 1 | −0.295 | 6.06e−003 | 1.496 |
| 2 | 0.931 | 3.03e−003 | 1.251 |
| 3 | −1.100 | 6.06−003 | 1.225 |

Under such conditions, $\Sigma\phi_i\Delta i(h_i/h_l)^2=-0.0075\phi$, which satisfies the expression (1).

The relationship between the wavelength of the laser beam and the spherical aberration (vertical aberration) in the optical pickup objective lens system 1 of the first example is shown in FIG. 3, and the relationship between the variation in wavelength and the surface aberration is shown in FIG. 4. According to FIG. 3, it can be seen that the spherical aberration can be suppressed sufficiently, and the chromatic aberration on the axis can be corrected satisfactorily, with regard to a variation in wavelength in a range of ±5 nm from the standard wavelength (405 nm). In addition, the wave-front aberration acceptable in the optical pickup objective lens system 1 is generally equal to or smaller than 0.07 λrms, but according to FIG. 4, even if a variation in wavelength in a range of ±10 nm from the standard wavelength (405 nm) is generated, the wave surface aberration can be suppressed sufficiently to equal to or smaller than 0.07 λrms.

SECOND EXAMPLE

FIG. 5 shows a second example of the present invention. In an optical pickup objective lens system 1 according to the second example of the present invention, three first, second and third lenses 2, 3 and 4 having negative, positive and negative powers are bonded to one another through two joint faces 5 and 6 sequentially in the order from the side of an object, as in the embodiment shown in FIG. 1.

The optical pickup objective lens system 1 according to the second example is set under the following conditions: Standard wavelength=405 nm; incidence pupil radius=3 mm; NA=0.85; fl=1.76 mm; ϕ=0.568182 (1/mm)

| | | | $n_i$ | | |
|---|---|---|---|---|---|
| i | $c_i$ | $d_i$ | 405 nm | 400 nm | 410 nm |
| 1 (First face of first lens | 0.744 | 0.01 | 1.618 | 1.620 | 1.617 |
| 2 (Joint face between first and second lens) | 1.113 | 1.89 | 1.710 | 1.711 | 1.709 |
| 3 (Joint face between second and third lens) | −1.276 | 0.01 | 1.618 | 1.620 | 1.617 |
| 4 (Second face of third lens | 0.162 | 0.59 | | | |
| 5 (First face of optical recording medium) | 0.000 | 0.10 | 1.618 | 1.620 | 1.617 |
| 6 (Second face of optical recording medium) | 0.000 | 0.00 | | | |

Aspherical Index

| i | k | A | B | C | D |
|---|---|---|---|---|---|
| 1 | −0.422838 | −2.77e−003 | 5.43e−003 | 0 | 0 |
| 2 | −0.534745 | 6.95e−002 | −6.12e−003 | 0 | 0 |
| 3 | −9.439338 | −7.73e−003 | 7.26e−003 | 0 | 0 |
| 4 | 0 | 0.1029322 | −5.72e−002 | 0 | 0 |

| i | $\phi_i$ | $\Delta_i$ | $h_i$ |
|---|---|---|---|
| 1 | −0.226 | 6.06e−003 | 1.496 |
| 2 | 0.905 | 2.92e−003 | 1.257 |
| 3 | −0.889 | 6.06−003 | 1.219 |

Under such conditions, $\Sigma\phi_i\Delta i(h_i/h_l)^2=-0.0054\phi$, which satisfies the expression (1).

The relationship between the wavelength of the laser beam and the spherical aberration in the optical pickup objective lens system 1 of the first example is shown in FIG. 6. According to FIG. 6, it can be seen that the spherical aberration can be suppressed sufficiently, and the chromatic aberration on the axis can be corrected satisfactorily, with regard to a variation in wavelength in a range of ±5 nm from the standard wavelength (405 nm).

THIRD EXAMPLE

Figure 7:
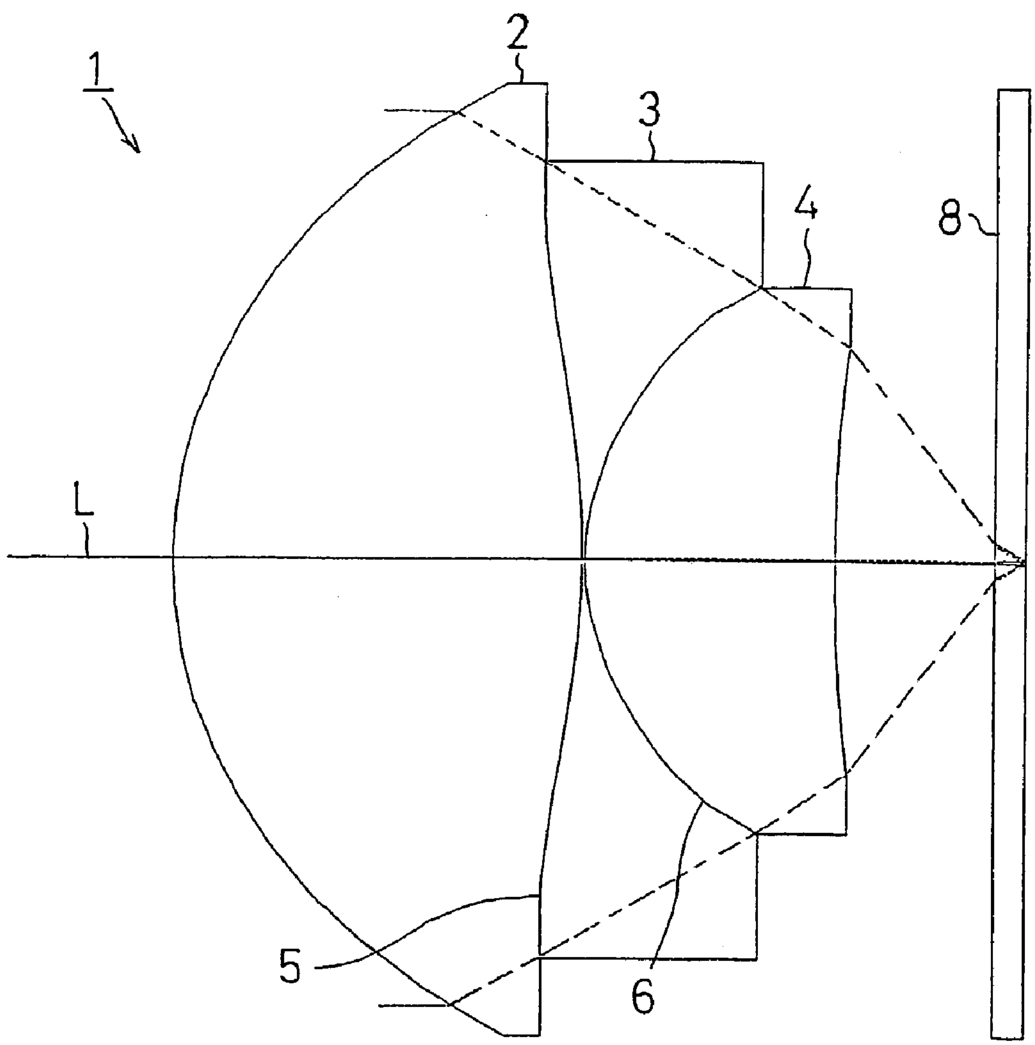
FIG. 7 is a schematic illustration showing the arrangement of a third example of an optical pickup objective lens system according to the present invention

FIG. 7 shows a third example of the present invention. In an optical pickup objective lens system 1 according to the third example of the present invention, three first, second and third lenses 2, 3 and 4 having positive, negative and positive powers are bonded to one another through two joint faces 5 and 6 in the order from the side of an object, unlike from the embodiment shown in FIG. 1.

The optical pickup objective lens system 1 according to the third example is set under the following conditions: Standard wavelength=405 nm; incidence pupil radius=3 mm; NA=0.85; fl=1.76 mm; $\phi$=0.568182 (1/mm)

| | | | $n_i$ | | |
|---|---|---|---|---|---|
| i | $c_i$ | $d_i$ | 405 nm | 400 nm | 410 nm |
| 1 (First face of first lens | 0.727 | 1.30 | 1.710 | 1.711 | 1.709 |
| 2 (Joint face between first and second lens) | −0.376 | 0.01 | 1.618 | 1.620 | 1.617 |
| 3 (Joint face between second and third lens) | 1.296 | 0.79 | 1.710 | 1.711 | 1.709 |
| 4 (Second face of third lens | 0.176 | 0.51 | | | |
| 5 (First face of optical recording medium) | 0.000 | 0.10 | 1.618 | 1.620 | 1.617 |
| 6 (Second face of optical recording medium) | 0.000 | 0.00 | | | |

Aspherical Index

| i | k | A | B | C | D |
|---|---|---|---|---|---|
| 1 | −0.429789 | 4.18e−003 | −1.99e−004 | 0 | 0 |
| 2 | 0 | 8.29e−002 | −6.23e−003 | 1.87e−003 | 0 |
| 3 | −0.293162 | −0.240384 | −0.149449 | 0.110354 | 0 |
| 4 | 0 | 3.07e−002 | −1.58e−002 | 0 | 0 |

| i | $\phi_i$ | $\Delta_i$ | $h_i$ |
|---|---|---|---|
| 1 | −0.678 | 2.92e−003 | 1.496 |
| 2 | −1.035 | 6.06e−003 | 1.406 |
| 3 | 0.848 | 2.92e−003 | 0.899 |

Under such conditions, $\Sigma\phi_i\Delta i(h_i/h_l)^2=-0.0047\phi$, which satisfies the expression (1).

Figure 8:
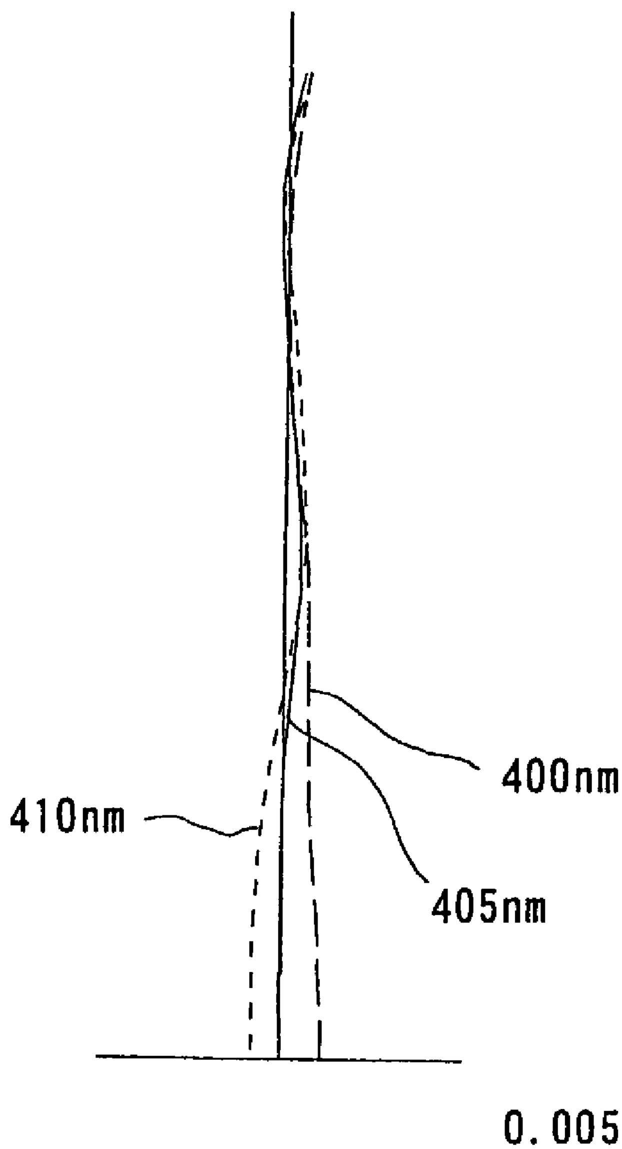
FIG. 8 is a diagram showing a spherical aberration of the optical pickup objective lens system shown in FIG. 7.

The relationship between the wavelength of the laser beam and the spherical aberration in the optical pickup objective lens system 1 of the third example is shown in FIG. 8. According to FIG. 8, it can be seen that the spherical aberration can be suppressed sufficiently, and the chromatic aberration on the axis can be corrected satisfactorily, with regard to a variation in wavelength in a range of ±5 nm from the standard wavelength (405 nm).

FOURTH EXAMPLE

FIG. 9 shows a fourth example of the present invention. In optical pickup objective lens system 1 according to the fourth example of the present invention, three first, second and third lenses 2, 3 and 4 having positive, negative and positive powers are bonded to one another through two joint faces 5 and 6 in the order from the side of an object, as in the embodiment shown in FIG. 7.

The optical pickup objective lens system 1 according to the fourth example is set under the following conditions: Standard wavelength=405 nm; incidence pupil radius=3 mm; NA=0.85; fl=1.76 mm; $\phi$=0.568182 (1/mm)

| | | | $n_i$ | | |
|---|---|---|---|---|---|
| i | $c_i$ | $d_i$ | 405 nm | 400 nm | 410 nm |
| 1 (First face of first lens | 0.702 | 1.16 | 1.736 | 1.737 | 1.735 |
| 2 (Joint face between first and second lens) | −0.183 | 0.01 | 1.618 | 1.620 | 1.617 |
| 3 (Joint face between second and third lens) | 1.386 | 0.87 | 1.736 | 1.737 | 1.735 |
| 4 (Second face of third lens | 0.279 | 0.52 | | | |
| 5 (First face of optical recording medium) | 0.000 | 0.10 | 1.618 | 1.620 | 1.617 |
| 6 (Second face of optical recording medium) | 0.000 | 0.00 | | | |

Aspherical Index

| i | k | A | B | C | D |
|---|---|---|---|---|---|
| 1 | −0.362823 | 2.08e−003 | −5.66e−004 | 0 | 0 |
| 2 | 0 | 5.61e−002 | −3.64e−003 | 0 | 0 |
| 3 | −0.280307 | −8.94e−002 | −3.61e−002 | 0 | 0 |
| 4 | 0 | 3.16e−002 | −9.11e−003 | 0 | 0 |

| i | $\phi_i$ | $\Delta_i$ | $h_i$ |
|---|---|---|---|
| 1 | 0.605 | 3.03e−003 | 1.496 |
| 2 | −0.971 | 6.06e−003 | 1.406 |
| 3 | 0.919 | 3.03e−003 | 0.847 |

Under such conditions, $\Sigma\phi_i\Delta i(h_i/h_l)^2=-0.0043\phi$, which satisfies the expression (1).

Figure 10:
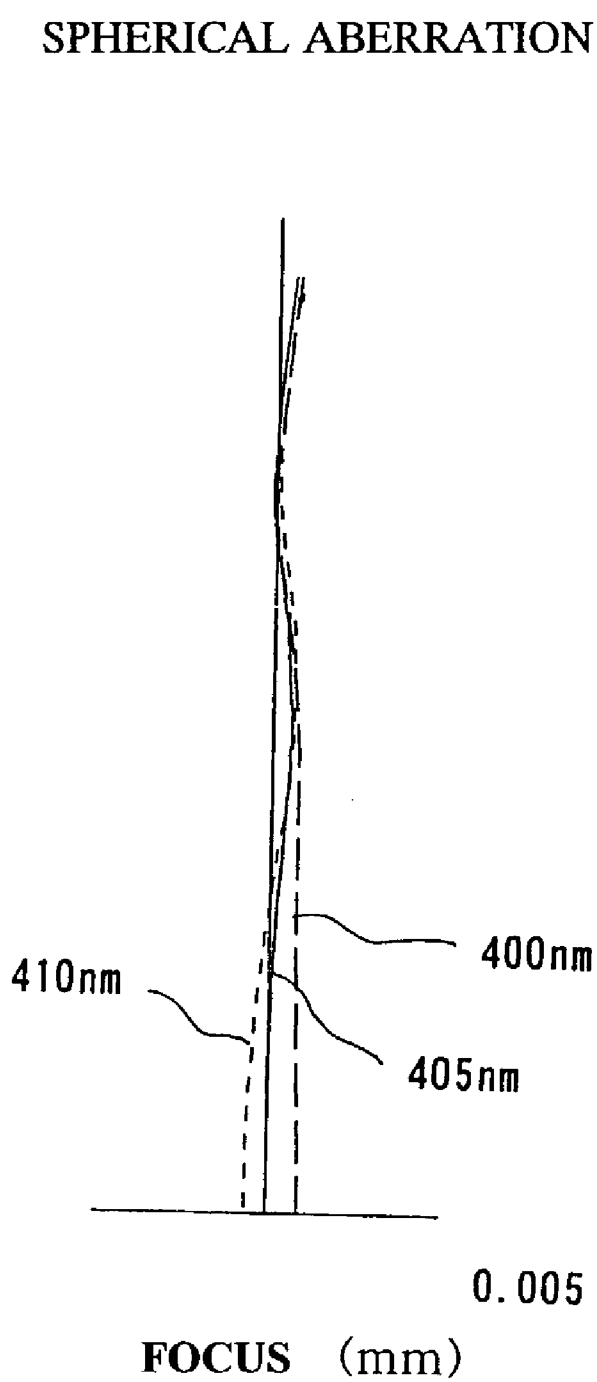
FIG. 10 is a diagram showing a spherical aberration of the optical pickup objective lens system shown in FIG. 9.

The relationship between the wavelength of the laser beam and the spherical aberration in the optical pickup objective lens system 1 of the fourth example is shown in FIG. 10. According to FIG. 10, it can be seen that the spherical aberration can be suppressed sufficiently, and the chromatic aberration on the axis can be corrected satisfactorily, with regard to a variation in wavelength in a range of ±5 nm from the standard wavelength (405 nm).

COMPARATIVE EXAMPLE

FIG. 11 shows a conventional optical pickup objective lens system 7 of a single-lens type as a comparative example. The lens system 7 is set under the following conditions: Standard wavelength=405 nm; incidence pupil radius=3 mm; NA=0.85; fl=1.76 mm; $\phi$=0.568182 (1/mm)

| | | | $n_i$ | | |
|---|---|---|---|---|---|
| i | $c_i$ | $d_i$ | 405 nm | 400 nm | 410 nm |
| 1 (First face of first lens | 0.792 | 1.70 | 1.710 | 1.711 | 1.709 |
| 2 (Second face of first lens) | −0.019 | 0.715 | | | |
| 3 (First face of optical recording medium) | 0.000 | 0.10 | 1.618 | 1.620 | 1.617 |
| 4 (Second face of optical recording medium) | 0.000 | 0.00 | | | |

Aspherical Index

| i | k | A | B | C | D |
|---|---|---|---|---|---|
| 1 | −0.695151 | 1.76e−002 | 4.99e−003 | 1.21e−003 | 5.05e−004 |
| 2 | 0 | 1.23e−001 | −1.10e−001 | 5.10e−002 | −9.78e−003 |

Figure 12:
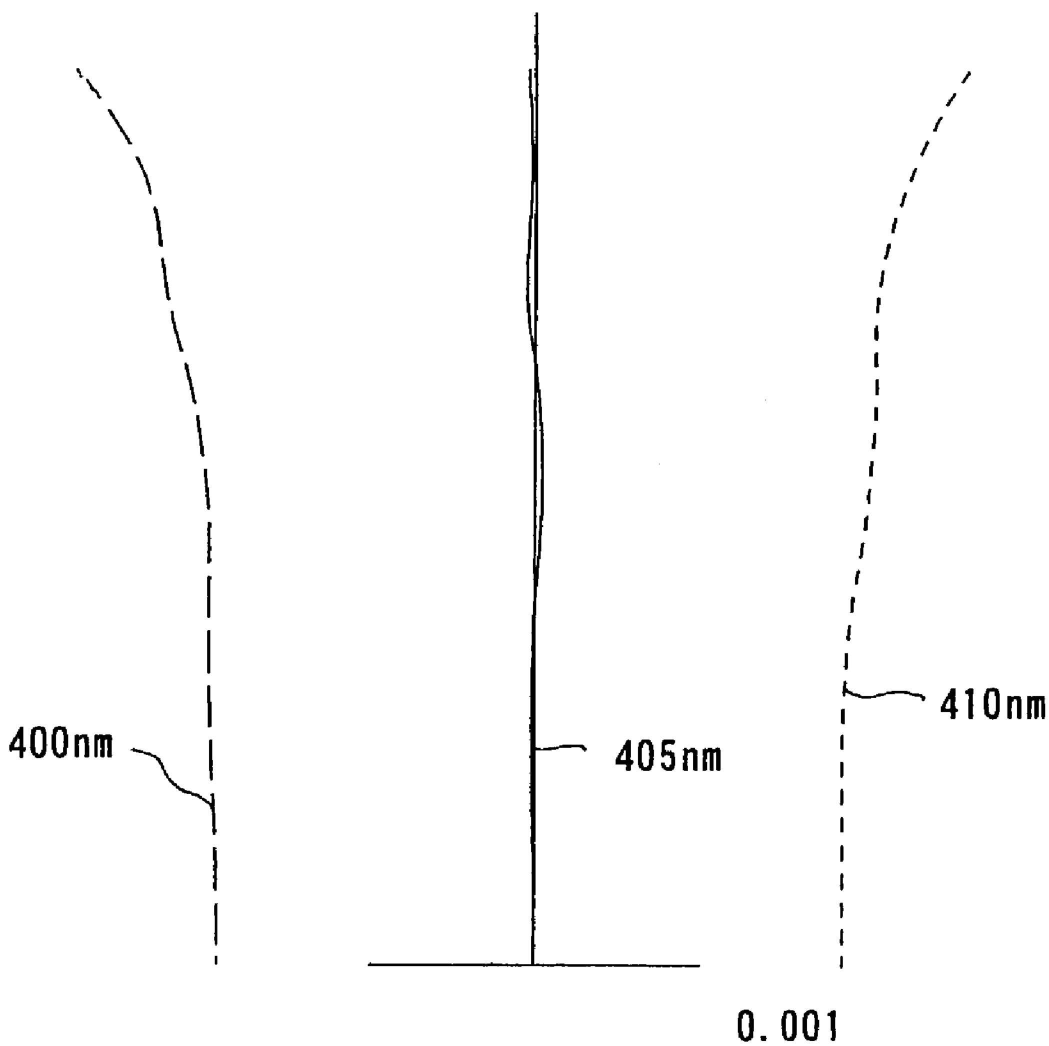
FIG. 12 is a diagram showing a spherical aberration of the optical pickup objective lens system shown in FIG. 11.

The relationship between the wavelength of the laser beam and the spherical aberration in the optical pickup objective lens system 7 of the comparative example is shown in FIG. 12. According to FIG. 12, it can be seen that the spherical aberration is varied largely, and the chromatic aberration on the axis cannot be corrected satisfactorily, with regard to a variation in wavelength in a range of ±5 nm from the standard wavelength (405 nm).

Although the embodiments of the present invention have been described in detail, it will be understood that the present invention is not limited to the above-described embodiment, and various modifications in design may be made without departing from the spirit and scope of the invention defined in claims.

For example, the first, second and third lenses 2, 3 and 4 may be bonded to one another by an insertion-molding process, by a process for the resinous lens using a photo-setting resin, or by a process for sticking the three lenses together using an optical adhesive.

What is claimed is:

1. An optical pickup objective lens system for collecting a laser beam emitted from a light source onto a recording surface of an optical recording medium, comprising three lenses having negative, positive and negative powers sequentially or positive, negative and positive powers sequentially in the order from the side of the light source toward the optical recording medium, the three lenses being bonded to one another through two joint faces, each of at least the two joint faces being formed into an aspherical shape.

2. An optical pickup objective lens system according to claim 1, wherein said lens system satisfies the following condition expression:

$$-0.01\ \phi < \Sigma\phi_i \Delta i (h_i/h_1)^2 < 0\phi \quad (1)$$

wherein $\phi$ is a power of the entire optical pickup objective lens system; $\phi_i$ is a power of each of the lenses (i=1, 2, 3); $\Delta i$ is a dispersing ability of a material for each of the lenses in a wavelength in the vicinity of a used wavelength ($\Delta i = (n_{i1} - n_{ih})/(n_{ic} - 1)$), wherein $n_{ic}$ represents a refractive index in the used wavelength; $n_{i1}$ represents a refractive index in a shorter wavelength, and $n_{ih}$ represents a refractive index in a longer wavelength); and $h_i$ is an effective height of each of the lenses.

* * * * *